United States Patent [19]

Russell et al.

[11] 4,093,105

[45] June 6, 1978

[54] PLASTIC CONTAINER WITH VENT MEANS

[75] Inventors: Walter W. Russell, Philadelphia, Pa.; Richard P. Stoetzer, Cinnaminson, N.J.

[73] Assignee: N. T. Gates Company, Pennsauken, N.J.

[21] Appl. No.: 843,631

[22] Filed: Oct. 19, 1977

[51] Int. Cl.² ............................................. B65D 51/16
[52] U.S. Cl. ................................................. 220/373
[58] Field of Search ....... 220/373, 374, 367, DIG. 27; 222/565, 142.1, 142.8; 206/1.5

[56] References Cited

U.S. PATENT DOCUMENTS 3,485,416 12/1969 Fohrman ........................... 222/142.1

Primary Examiner—George T. Hall
Attorney, Agent, or Firm—Jacob Trachtman

[57] ABSTRACT

A plastic container includes a one piece plastic body portion having a cylindrical outer wall and a bottom wall, and a one piece cap portion having a cylindrical outer wall and a top wall. The outer wall of the cap has a snap fit around a portion of the outer wall of the body to hold the cap on the body. The top wall and the bottom wall have a plurality of small holes therethrough which allow gases and vapors to enter the container but prevent the contents of the container from leaving the container. The holes are in the shape of square truncated pyramids with the larger area ends of the holes being at the inside surface of the respective walls. A label may be secured around the cylindrical outer surface of the container across the junction between the body and the cap to help prevent removal of the cap from the body.

10 Claims, 5 Drawing Figures

PLASTIC CONTAINER WITH VENT MEANS

The present invention relates to a plastic container and particularly to a plastic container which will permit gases and vapors to enter the container but prevent the contents of the container from leaving it.

There are various uses for a container which will allow gases and vapors to enter the container but which prevents the contents of the container from leaving the container. One such use is as a desiccant container. Such a container must permit entry of gases and vapors. Also, it is desirable that the container be capable of being easily filled and assembled, particularly by automatic equipment, even when very small in size as would be required for pharmaceutical and chemical desiccant containers.

It is therefore an object of the present invention to provide a novel plastic container.

It is another object of the present invention to provide a plastic container which will permit gases and vapors to enter the container but not allow the contents of the container to leave it.

It is still another object of the present invention to provide a plastic container which will permit gases and vapors to enter it but not allow the contents thereof to leave, and which is relatively rigid and easy to fill and assemble.

It is another object of the present invention to provide a plastic container which will permit gases and vapors to enter it but not allow the contents thereof to leave, and which can be made in very small size.

Other objects will appear hereinafter.

These objects are achieved by a plastic container which includes a one piece cup-shaped body having a plurality of small holes through the bottom thereof and a one piece cap fitting on the body and having a plurality of small holes in the top thereof. The ends of the holes in the body and cap at the exterior of the container are smaller in area than the ends at the interior of the container.

The invention accordingly comprises an article of manufacture possessing the features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawing in which.

Figure 1:
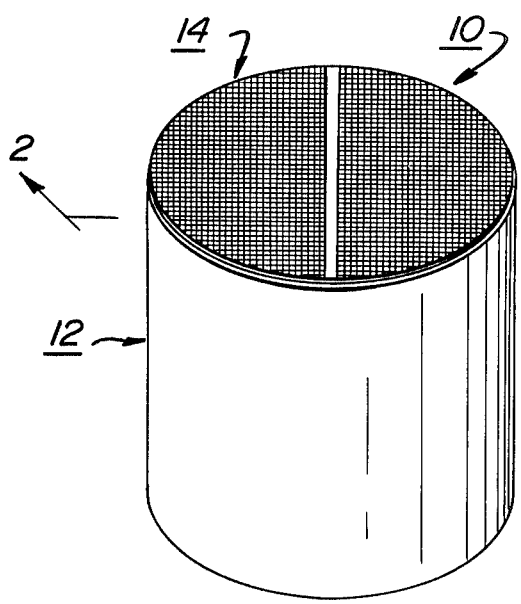
FIG. 1 is a perspective view of the plastic container of the present invention.
Figure 2:
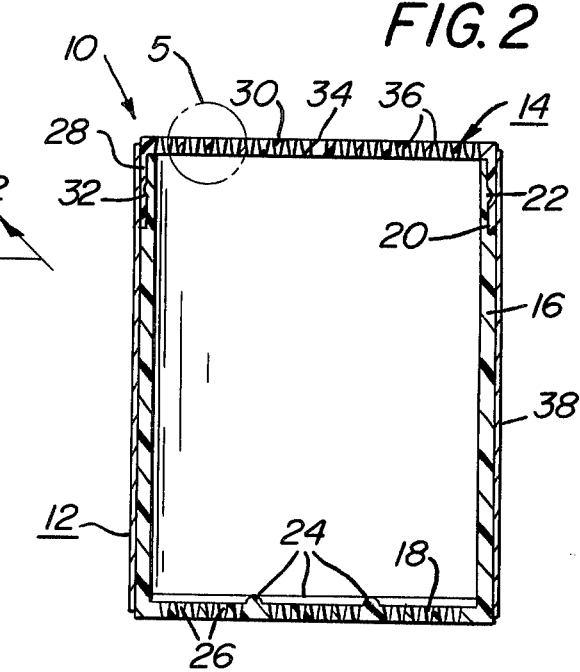
FIG. 2 is a sectional view taken along line 2—2 of FIG. 1.
Figure 3:
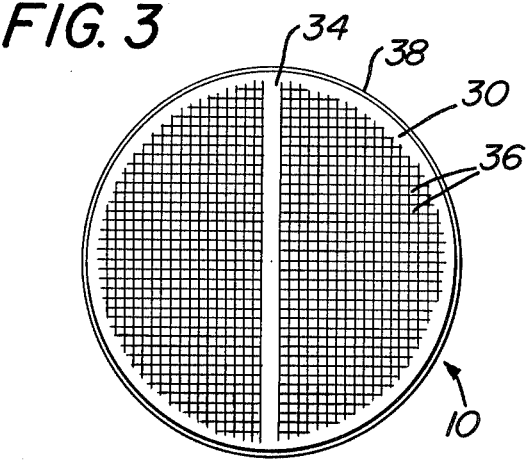
FIG. 3 is a plan view of the top wall of the cap of the container.
Figure 4:
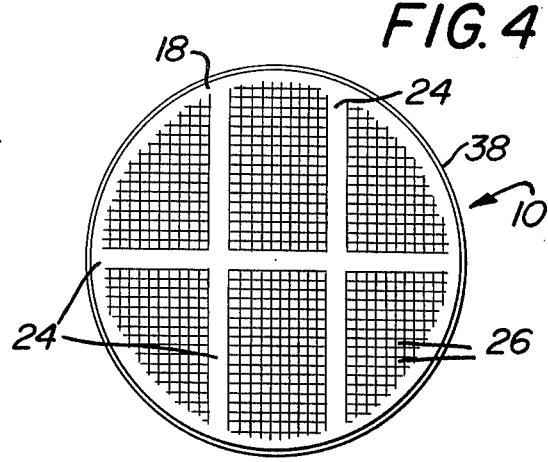
FIG. 4 is a plan view of the bottom wall of the body of the container.
Figure 5:
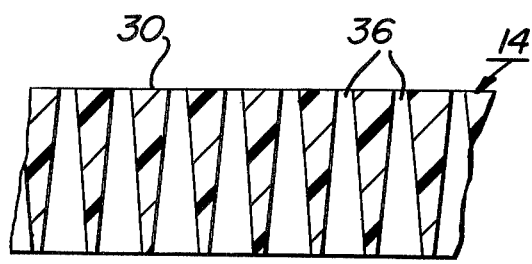
FIG. 5 is an enlarged portion, in section, of FIG. 2, within the dashed circle 5.

Referring to the drawing, the container of the present invention is generally designated as 10. Container 10 includes a one piece body 12 and a one piece cap 14, each of which is made entirely of plastic. The body 12 is substantially cup-shaped and has a cylindrical outer wall 16 and a flat bottom wall 18. The outer wall 16 of the body 12 has a recess 20 in its outer surface at the free end thereof. A rounded locking rib 22 projects radially outwardly from the bottom of the recess 20. The bottom wall 18 has three reinforcing ribs 24 extending thereacross with one of the reinforcing ribs extending diametrically across the bottom wall, and the other two reinforcing ribs extending in spaced parallel relation across and perpendicular to the one rib. In the areas of the bottom wall 18, between the reinforcing ribs 24 and the outer wall 16, are a plurality of small holes 26. Each of the holes 26 is in the shape of a truncated square pyramid. The area of the ends of the holes 26 at the interior surface of the bottom wall 18 is larger than the area of the ends of the holes at the exterior of the bottom wall.

The cap 14 includes a cylindrical outer wall 28 and a flat top wall 30. The outer diameter of the cap outer wall 28 is equal to the outer diameter of the body outer wall 16. The inner diameter of the cap outer wall 28 is equal to the diameter of the bottom surface of the recess 20 in the outer wall of the body. The length of the cap outer wall 28 is substantially equal to the length of the recess 20. The cap outer wall 28 has a rounded recess 32 around its inner surface. Thus, the cap outer wall 28 can fit around the free end portion of the body outer wall 16 with the outer surface of the cap outer wall 28 being flush with the outer surface of the body outer wall 16, and with the locking rib 22 snap fitting into the recess 32 to lock the cap 14 on the body 12. The top wall 30 of the cap 14 has a reinforcing rib 34 extending diametrically thereacross. A plurality of small holes 36 extend through the top wall 30 in the area between the reinforcing rib 34 and the outer wall 28. The holes 36, like the holes 26 in the bottom wall 18, are shaped as truncated, square pyramids having their smaller area ends at the outer surface of the top wall and their larger area ends at the inner surface. The holes 36 are of the same dimensions as the holes 26.

The container 10 can be made as small as $\frac{1}{2}$ inches in height and 17/32 inches in diameter. The holes 26 and 36 can be as small as 0.007 inches at their small end and 0.018 inches at their larger end. The bottom wall 18 can contain about 250 of the small holes 26, and the top wall 30 can contain about 300 of the holes 36. The shape of the container 10 allows the body 12 to be filled and the cap 14 applied to the body 12 mechanically even through the container is very small. Once the cap 14 is placed on the body 12, a label 38 can be secured around the cylindrical wall of the container with the label extending across the junction between the body 12 and the cap 14. Thus, the label 30 serves to indicate the contents of the container 10, and in addition assists in preventing the cap 14 from being accidently removed from the body 12. The shape of the container 10 and the shape of the holes 26 and 36 permit ease of molding the body and the cap so that they can be formed completely of plastic to provide for greater rigidity of the container. The shape of the holes 26 and 36 prevent the contents of the container, even in granular form, from leaving the container since the pieces of the contents would merely become jammed or wedged in the small holes. However, gases and vapors can pass through the holes even when filled with desiccant particles to enter the container, so that the container can be used for holding a desiccant and absorbing gases and vapors received into it.

It will thus be seen that the objects set forth above, among those made apparent from the preceding description, are efficiently attained and, since certain changes may be made in the above articles without departing from the scope of the invention, it is intended that all matter contained in the above description or shown in the accompanying drawing shall be interpreted as illustrative and not in a limiting sense.

What we claim is:

1. A container comprising a plastic cup-shaped body, and a plastic cap removably fitting on said body, each of said body and cap having a plurality of small holes therethrough with said holes being larger in area at the inner surface of the container than at the outer surface thereof.

2. A container in accordance with claim 1 in which the holes in the body and cap are of the shape of truncated square pyramids.

3. A container in accordance with claim 2 in which the holes are in the bottom of the body and the top of the cap.

4. A container in accordance with claim 3 in which the body has a cylindrical outer wall and a bottom wall, the cap has a cylindrical outer wall and a top wall, and the outer wall of the cap fits around the free end of the outer wall of the body.

5. A container in accordance with claim 4 in which the outer wall of the body has a recess in its outer surface adjacent the free end of the outer wall, and the outer wall of the cap fits in the recess in the outer wall of the body with the outer surface of the cap outer wall being a continuation of the outer surface of the body outer wall.

6. A container in accordance with claim 5 in which the cap has an annular recess in the inner surface of its outer wall, and the body has a locking rib projecting from the bottom of the recess in its outer wall with the rib fitting into the recess in the cap outer wall to hold the cap on the body.

7. A container in accordance with claim 6 in which the bottom of the body and the top of the cap each have at least one reinforcing rib extending thereacross.

8. A container in accordance with claim 7 including a label secured around the container and extending across the junction between the cap and the body.

9. A container in accordance with claim 4 in which each of the holes in the cap and body is 0.007 inches across at its smaller end and 0.018 inches across at its larger end.

10. A container in accordance with claim 9 in which the container is about ½ inches in height and about 17/32 inches in diameter.

* * * * *